United States Patent
Gruver

(10) Patent No.: US 6,429,391 B1
(45) Date of Patent: Aug. 6, 2002

(54) POCKET-SIZED GAME SCALE AND MEASURING DEVICE

(76) Inventor: Eric K. Gruver, 347 Kinsman Rd., Greenville, PA (US) 16125

( * ) Notice: Subject to any disclaimer, the term of this patent is extended or adjusted under 35 U.S.C. 154(b) by 24 days.

(21) Appl. No.: 09/664,098

(22) Filed: Sep. 19, 2000

Related U.S. Application Data

(60) Provisional application No. 60/211,968, filed on Jun. 16, 2000.

(51) Int. Cl.[7] .......................... G01G 19/56; G01G 21/28
(52) U.S. Cl. ........................................ 177/148; 177/243
(58) Field of Search ............................... 177/148, 238, 177/243, 149, 168, 169, 225, 232, 131, 233

(56) References Cited

U.S. PATENT DOCUMENTS

| | | | | |
|---|---|---|---|---|
| 519,353 A | * | 5/1894 | Shepard | 177/233 |
| 1,311,779 A | | 7/1919 | Shank | |
| 1,587,904 A | * | 6/1926 | Duncan | 177/233 |
| 1,962,570 A | | 6/1934 | Nelson et al. | 17/8 |
| 2,003,893 A | | 6/1935 | La Pan | 43/23 |
| 2,603,474 A | * | 7/1952 | Mandolf et al. | 177/233 |
| 4,660,666 A | | 4/1987 | Reder et al. | 177/148 |
| 4,721,174 A | | 1/1988 | Letzo | 177/225 |
| 4,763,942 A | | 8/1988 | Lyon | 294/79 |
| 4,785,897 A | | 11/1988 | Keinert, Jr. | 177/232 |
| 4,828,307 A | | 5/1989 | Sokol et al. | 294/79 |
| 4,936,399 A | | 6/1990 | Christman et al. | 177/210 C |
| 4,995,188 A | | 2/1991 | Ewing | 43/23 |
| 5,031,710 A | * | 7/1991 | Parker et al. | 177/225 |
| 5,339,532 A | | 8/1994 | O'Keefe | 33/511 |
| 5,526,575 A | | 6/1996 | Hoover et al. | 33/485 |
| 5,588,907 A | | 12/1996 | DePietro et al. | 452/187 |
| 5,637,838 A | | 6/1997 | Arey et al. | 177/148 |
| 5,922,999 A | | 7/1999 | Yang | 177/148 |

FOREIGN PATENT DOCUMENTS

| | | | | |
|---|---|---|---|---|
| DE | 19519673 | 11/1995 | | |
| GB | 6822 | 3/1910 | | |
| GB | 815455 | 11/1957 | | |
| GB | 1321571 | 1/1972 | ............ | A22C/15/00 |
| GB | 2082031 | 8/1980 | .......... | A01K/97/00 |

* cited by examiner

*Primary Examiner*—Randy W. Gibson
(74) *Attorney, Agent, or Firm*—Richard C. Litman

(57) ABSTRACT

A pocket-sized scale and measuring device used to weigh and measure captured small game such as turkey, pheasant, grouse, squirrel, ground hog, raccoon, etc. The first embodiment utilizes a digital scale that can weigh a small game animal, while holding the animal with a cable loop and slide lock. A sturdy handle is part of the rectangular thermoplastic housing as well as a picture and listing of some common small game animals. A retractable tape measure is also provided to measure the approximate length of the captured small game animal. A portable battery power source is also provided. A second embodiment is also provided with a spring mechanized scale as well as a cable loop and slide lock and retractable tape measure.

4 Claims, 4 Drawing Sheets

POCKET-SIZED GAME SCALE AND MEASURING DEVICE

CROSS-REFERENCE TO RELATED APPLICATION

This application claims the benefit of U.S. Provisional Patent Application Serial No. 60/211,968, filed Jun. 16, 2000.

BACKGROUND OF THE INVENTION

1. Field of the Invention

The present invention relates to a pocket-sized game scale and measuring device.

2. Description of Related Art

Hunting and fishing have always been great American past times. originally done as a necessity for food, hunting and fishing have developed into sports that are enjoyed by many Americans. The related art describes a number of devices that can be used to measure the weight and size of captured fish and game.

U.S. Pat. No. 1,962,570 issued to Nelson et al. outlines the use of a device that enables a person to more easily clean and scale fish without having that person's hands smell like fish. The device also has a supplemental spring scale that can accurately weigh a captured fish.

U.S. Pat. No. 5,588,907 issued to DePietro et al. outlines the use of a gaming hoist to hang game or other objects. The gaming hoist is portable and can be hung from an existing supporting structure. A winch and cable arrangement is also provided to hoist large gaming animals. No weighing arrangement to determine the weight of an animal being hung by the gaming hoist however, is provided.

U.S. Pat. No. 4,660,666 issued to Reder et al. outlines the use of a digital weighing scale that is used to weigh caught fish. The scale includes a Wheatstone Bridge and a strain gauge and is designed to be a portable and battery operated unit. The scale also has selective circuitry for reading the temperature of water. A choice of American or metric units of measure can be selectively utilized.

U.S. Pat. No. 4,721,174 issued to Letzo outlines the use of a fish scale that is connectable to a fishing rod or safety rail of a boat. The scale is a light-duty fish scale and is not intended for use with large ocean fish. The scale is a coil spring pulltype activated weight scale, which conveniently indicates the weight of small freshwater fish.

U.S. Pat. No. 4,995,188 issued to Ewing outlines a fishing rod that also has the capability to weigh and measure fish. The handle of the fishing rod has a calibrated compression spring and hook, which is used to weigh a caught fish, which is attached to the end of the hook. There is also calibrated indicia over the length of the rod which can be used to measure the length of a caught fish.

U.S. Pat. No. 5,922,999 issued to Yang outlines a portable device that is used to measure the weight of caught fish. A spring scale and hook are utilized to weigh the caught fish. The scale can also be easily calibrated and also includes a compass as part of the device.

Each of the devices described in each of the above patents are useful devices. However, what is really needed and what is not described in the related art is a device that can be used to weigh and measure the size and weight of captured hunting game. A similar device is described in the Ewing patent, but that device is used for measuring and weighing fish and not captured hunting game.

None of the above inventions and patents, taken either singly or in combination, is seen to describe the instant invention as claimed.

SUMMARY OF THE INVENTION

The invention is a pocket-sized scale and measuring device used to weigh and measure captured small game such as turkey, pheasant, grouse, squirrel, ground hog raccoon, etc. The first embodiment utilizes a digital scale that can weigh a small game animal, while holding the animal with a cable loop and slide lock. A sturdy handle is part of the rectangular thermoplastic housing. The housing also has a picture and listing of some common small game animals. A retractable tape measure is provided to measure the approximate length of a captured small game animal. A portable battery power source is provided. A second embodiment is also described with a spring mechanized scale as well as a cable loop and slide lock, and retractable tape measure.

Accordingly, it is a principal object of the invention to provide a device that can weigh and measure captured small game animals.

It is another object of the invention to provide a digital scale to weigh small game animals.

It is a further object of the invention to provide a device with a sturdy handle to weigh and capture small game animals.

Still another object of the invention is to provide a portable pocket-sized scale and measuring device to weigh and measure captured small game animals.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
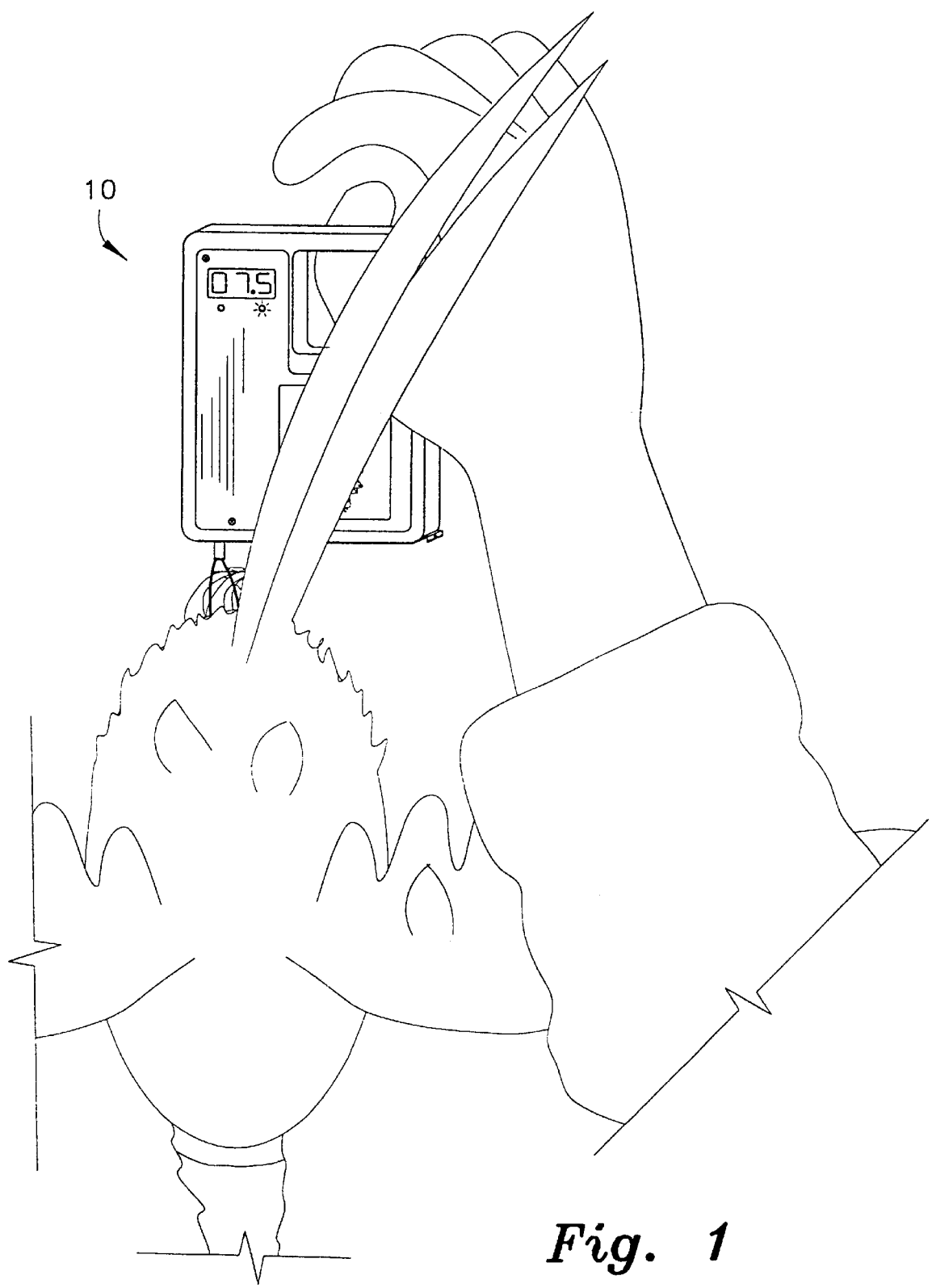
FIG. 1 is an environmental, perspective view of a pocket-sized game scale and measuring device according to the present invention.

The present invention is a pocket-sized game scale and measuring device 10, as depicted in FIG. 1.

Figure 2:
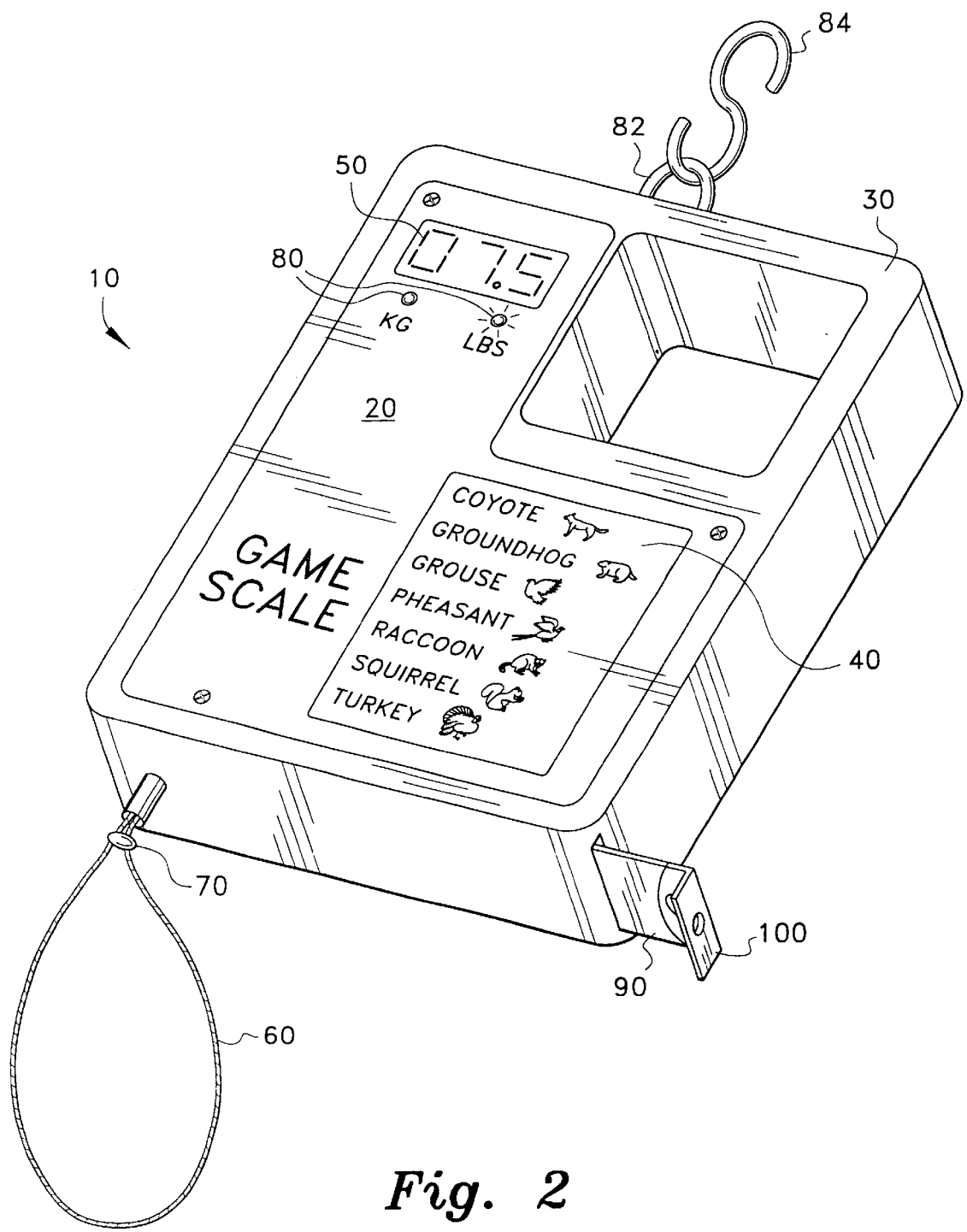
FIG. 2 is a frontal perspective view of the first embodiment of a digital pocket-sized game scale and measuring device.

The first embodiment of the pocket-sized game scale and measuring device 10 is comprised of a rectangular thermoplastic housing 20 for holding the components of the device 10, a weighing means for measuring the weight of a captured game animal, a measuring means for measuring the length of a captured game animal, a handle 30 formed from a corner of the rectangular thermoplastic housing 20 and a picture of a variety of game animals 40 with the name of each game animal placed next to the animal's picture. The handle 30 makes for an easy and stable grip for the device 10 as a captured animal is being weighed. The device 10 is designed to weigh and measure small game animals such as turkey, pheasant, grouse, squirrel, ground hog, coyote and raccoon, as are shown in FIG. 2.

The pocket-sized game scale and measuring device 10 utilizes a weighing means that is in the form of a digital scale with LED display 50 and cable loop 60 with a holding means for holding the captured game animal while being weighed. The LED display 50 can display the weight of the weighed animal in kilograms or pounds, as indicated by the indicator lights 80 underneath the LED display 50. A toggle switch (not shown) is provided on the side of the device 10 to indicate whether pounds or kilograms are to be displayed.

The holding means is a manually adjustable slide lock 70 that is looped around and drawn tightly around the feet of the captured animal for holding the animal while the animal is getting weighed. The cable loop 60 can expand to about 10 inches in diameter and is made of steel cable and can comfortably weigh a small game animal of less than 50 lbs. There is also a cloth loop 82 and "s hook" 84 for hunters without the upper arm strength to hold up the captured game.

The device 10 also utilizes a retractable metal tape measure 90 that can be used to measure the length of a small captured game animal. A small metal tab 100 is provided on the end of the retractable tape measure 90 to help measure the length of any small captured game animal. The retractable tape measure 90 can extend up to 36 inches and has a control tab (not shown) on the side of the rectangular thermoplastic housing 20 that can temporarily freeze the length of the retractable tape measure 90.

Figure 3:
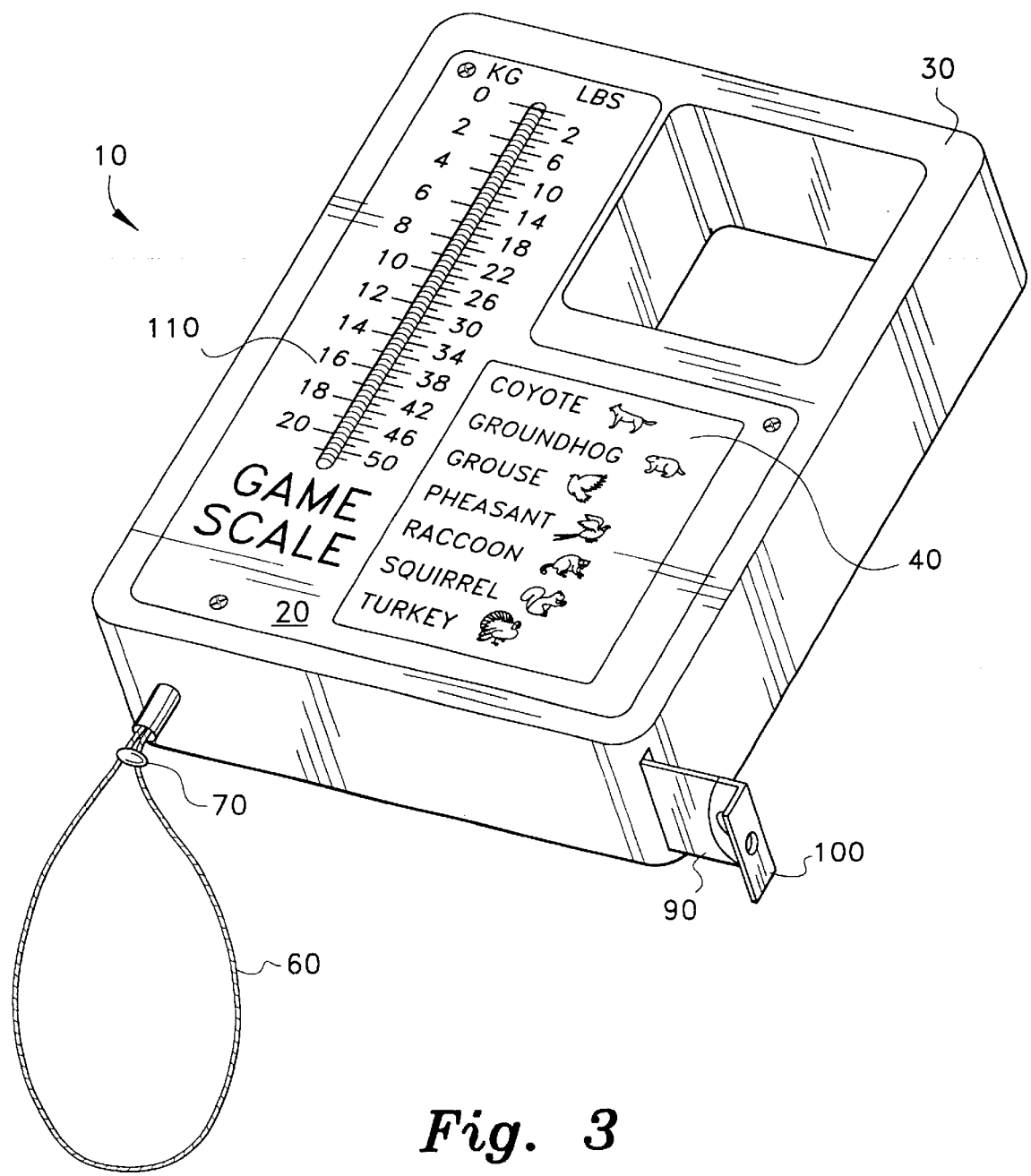
FIG. 3 is a frontal perspective view of the second embodiment of a pocket-sized spring game scale and measuring device.

The pocket-sized game scale and measuring device 10 has a second embodiment which utilizes a weighing means that is in the form of a spring scale with weight indicia 110, as shown in FIG. 3. The holding means for holding the captured game animal while being weighed is the same cable loop 60 and slide lock 70 that is incorporated into the first embodiment of the invention. The rectangular thermoplastic housing 20, the handle 30 and retractable tape measure 90 and metal tab 100 are also identical to that of the first embodiment.

Figure 4:
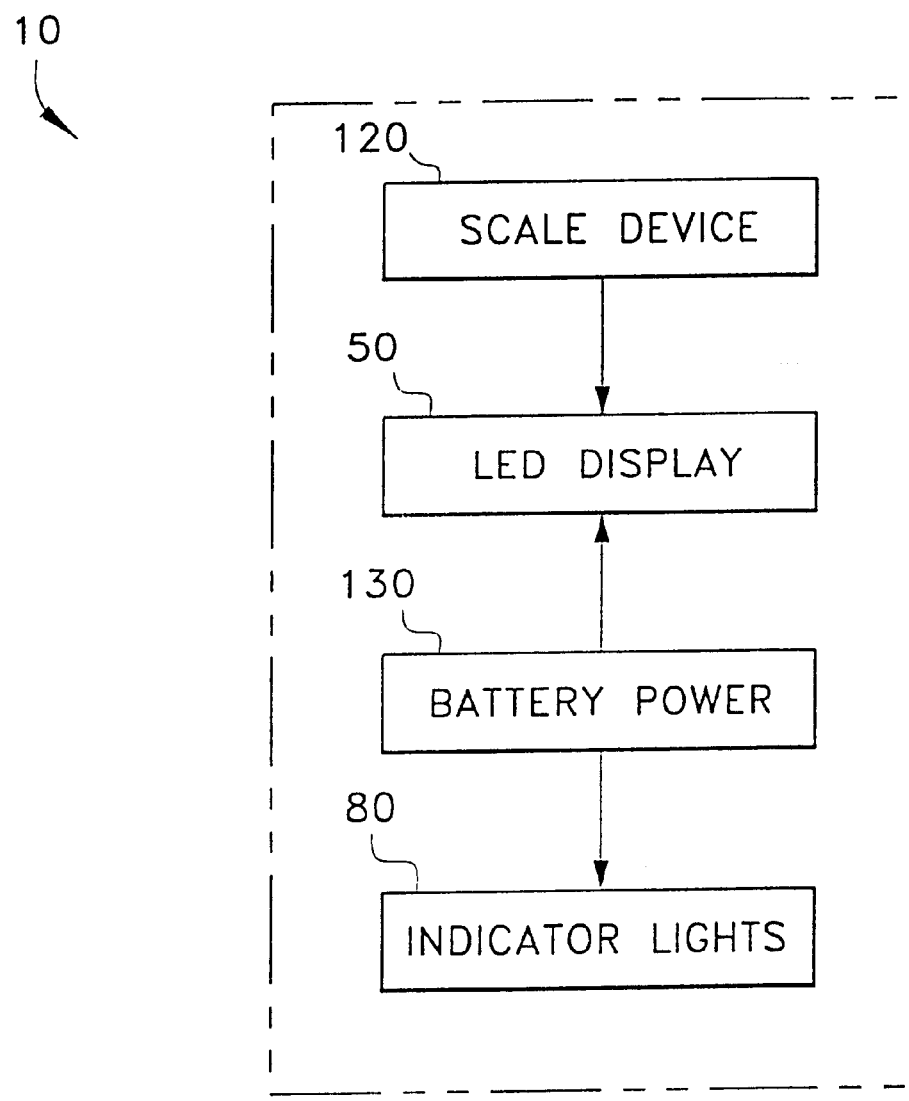
FIG. 4 is an electrical diagram of a digital pocket-sized game scale and measuring device.

FIG. 4 outlines a basic wiring diagram of the digital embodiment of the device 10. The scale device 120 is simply the spring scale assembly or digital assembly outlining one of the two embodiments of the device 10. The first embodiment utilizes a battery 130 as a power source and incorporates the indicator lights 80 and LED display 50.

Operation of the device is easy. The feet of a small game animal are encircled by the cable loop 60 and slide lock 70 while a user holds the device 10 freely in midair. Both embodiments can accurately weigh a small game animal up to 50 lbs. The retractable tape measure 90 and metal tab 100 can also be used manually to give an approximate length of a small game animal up to 36 inches in length. The rectangular thermoplastic housing 20 is made of sturdy thermoplastic that is well-known to those schooled in the art and is approximately 3" in width by 4", in length.

It is to be understood that the present invention is not limited to the embodiments described above, but encompasses any and all embodiments within the scope of the following claims.

I claim:

1. A pocket-sized game scale and measuring device, comprising:

a rectangular thermoplastic housing for holding the components of the device;

a digital scale with LED display for measuring the weight of a captured game animal and cable loop with a manually adjustable slide lock for holding the captured game animal while being weighed;

a measuring means for measuring the length of a captured game animal;

a handle formed from a corner of the rectangular thermoplastic housing; and a picture of a variety of game animals with the name of each game animal beside its picture.

2. The pocket-sized game scale and measuring device, according to claim 1, wherein said measuring means is a retractable tape measurer.

3. A pocket-sized game scale and measuring device, comprising:

a rectangular thermoplastic housing for holding the components of the device;

a spring scale with weight indicia for measuring the weight of a captured game animal and a manually adjustable slide lock for holding the captured game animal while being weighed;

a measuring means for measuring the length of a captured game animal;

a handle formed from a corner of the rectangular thermoplastic housing; and a picture of a variety of game animals with the name of each game animal beside its picture.

4. The pocket-sized game scale and measuring device, according to claim 3, wherein said measuring means is a retractable tape measurer.

\* \* \* \* \*